(12) United States Patent
Kasten (10) Patent No.: US 12,128,809 B2
(45) Date of Patent: Oct. 29, 2024

(54) VEHICLE-MOUNTED CONCRETE PUMP

(71) Applicant: Putzmeister Engineering GmbH, Aichtal (DE)

(72) Inventor: Knut Kasten, Ostfildern (DE)

(73) Assignee: Putzmeister Engineering GmbH, Aichtal (DE)

( * ) Notice: Subject to any disclaimer, the term of this patent is extended or adjusted under 35 U.S.C. 154(b) by 911 days.

(21) Appl. No.: 17/273,216

(22) PCT Filed: Aug. 13, 2019

(86) PCT No.: PCT/EP2019/071675
§ 371 (c)(1),
(2) Date: Mar. 3, 2021

(87) PCT Pub. No.: WO2020/048745
PCT Pub. Date: Mar. 12, 2020

(65) Prior Publication Data
US 2021/0323463 A1    Oct. 21, 2021

(30) Foreign Application Priority Data

Sep. 4, 2018  (DE) ..................... 10 2018 214 965.8

(51) Int. Cl.
*E04G 21/00* (2006.01)
*B60P 3/16* (2006.01)
(Continued)

(52) U.S. Cl.
CPC ............ *B60P 3/16* (2013.01); *E04G 21/0436* (2013.01); *E04G 21/0445* (2013.01);
(Continued)

(58) Field of Classification Search
CPC . E04G 21/0436; E04G 21/0445; F04B 17/05; F04B 15/02; F04B 17/03; F04B 17/06; B60P 3/16
See application file for complete search history.

(56) References Cited

U.S. PATENT DOCUMENTS 6,022,048 A    2/2000   Harshbarger et al.
6,164,923 A    12/2000  Mayer et al.
(Continued)

FOREIGN PATENT DOCUMENTS

CN    201326277 Y    10/2009
CN    202131775 U    2/2012
(Continued)

OTHER PUBLICATIONS

KR20110104003A—Driving arrangement for a pump or compressor, Machine Translation (Year: 2011).*
(Continued)

*Primary Examiner* — Anshu Bhatia
(74) *Attorney, Agent, or Firm* — Crowell & Moring LLP (57) ABSTRACT

A vehicle-mounted concrete pump includes: a concrete pump system designed to convey concrete; a hydraulic drive pump system which is designed to drive the concrete pump system and comprises a hydraulic pump drive shaft; a combustion drive motor system designed to drive the hydraulic pump drive shaft of the hydraulic drive pump system; and a liquid-cooled synchronous drive motor which is designed to drive the hydraulic pump drive shaft of the hydraulic drive pump system.

21 Claims, 2 Drawing Sheets

(51) Int. Cl.
*E04G 21/04* (2006.01)
*F04B 15/02* (2006.01)
*F04B 17/03* (2006.01)
*F04B 17/05* (2006.01)
*F04B 17/06* (2006.01)

(52) U.S. Cl.
CPC .............. *F04B 15/02* (2013.01); *F04B 17/03* (2013.01); *F04B 17/05* (2013.01); *F04B 17/06* (2013.01)

(56) References Cited

U.S. PATENT DOCUMENTS

| | | | |
|---|---|---|---|
| 6,705,030 | B2 | 3/2004 | Tokunaga |
| 7,216,730 | B2 | 5/2007 | Baginski et al. |
| 2008/0016862 | A1* | 1/2008 | Von Baumen ........ F15B 11/165 60/464 |
| 2009/0018716 | A1 | 1/2009 | Ambrosio |
| 2011/0236236 | A1 | 9/2011 | Larsen et al. |
| 2013/0056279 | A1 | 3/2013 | Osara et al. |
| 2013/0174541 | A1 | 7/2013 | Meinheit et al. |
| 2016/0145880 | A1 | 5/2016 | Mapelli et al. |
| 2018/0328157 | A1* | 11/2018 | Bishop .................... F04B 17/06 |
| 2018/0335025 | A1* | 11/2018 | Wilson .................... E04G 21/04 |

FOREIGN PATENT DOCUMENTS

| | | |
|---|---|---|
| CN | 102947114 A | 2/2013 |
| CN | 103038086 A | 4/2013 |
| CN | 202969950 U | 6/2013 |
| CN | 104499718 A | 4/2015 |
| CN | 204472590 U | 7/2015 |
| CN | 108382180 A | 8/2018 |
| DE | 40 41 117 A1 | 7/1992 |
| DE | 196 35 200 A1 | 3/1998 |
| DE | 102 16 308 B4 | 2/2007 |
| DE | 10 2004 028 620 B4 | 2/2008 |
| DE | 10 2010 046 615 A1 | 3/2012 |
| DE | 10 2010 011 859 A1 | 1/2013 |
| DE | 10 2012 005 299 A1 | 9/2013 |
| DE | 10 2015 122 591 A1 | 6/2017 |
| EP | 1 713 159 A1 | 10/2006 |
| EP | 3 023 212 A1 | 5/2016 |
| EP | 3 246 187 A1 | 11/2017 |
| JP | 10-37904 A | 2/1998 |
| JP | 2003-239852 A | 8/2003 |
| JP | 2006-136072 A | 5/2006 |
| JP | 2011-163072 A | 8/2011 |
| JP | 2017-77796 A | 4/2017 |
| KR | 10-2011-0104003 A | 9/2011 |

OTHER PUBLICATIONS

EP3246187A1—Hybrid drive for a motor vehicle, in particular for a commercial vehicle, Machine Translation (Year: 2017).*
"CIFA Hybrid Technology", Apr. 11, 2016 https://www.youtube.com/watch?v=JFW_KwvAsg4, XP054979888.
International Search Report (PCT/ISA/210) issued in PCT Application No. PCT/EP2019/0171675 dated Nov. 18, 2019 with English translation (six (6) pages).
German-language Written Opinion (PCT/ISA/237) issued in PCT Application No. PCT/EP2019/0171675 dated Nov. 18, 2019 (six (6) pages).
German-language Search Report issued in German Application No. 10 2018 214 965.8 dated Jun. 4, 2019 with partial English translation (15 pages).
German-language European Search Report issued in European Application No. 23173875.8 dated Sep. 6, 2023 with partial English translation (9 pages).
Chinese-language Office Action issued in Chinese Application No. 201980057967.4 dated Apr. 2, 2022 (seven (7) pages).
German-language European Office Action issued in European Application No. 19755333.2 dated Apr. 21, 2022 (five (5) pages).
German-language European Search Report issued in European Application No. 23174445.9 dated Sep. 6, 2023 with partial English translation (9 pages).
Chinese-language Office Action issued in Chinese Application No. 201980057967.4 dated Nov. 11, 2022 (eight (8) pages).
Japanese-language Office Action issued in Japanese Application No. 2021-536152 dated Apr. 4, 2023 with English translation (11 pages).
Korean-language Office Action issued in Korean Application No. 10-2021-7009494 dated Dec. 28, 2023 with English translation (14 pages).
German-language European Notice of Opposition issued in European Application No. 19755333.2 dated Mar. 6, 2024 (37 pages).
"Components for hybrid and all-electric drive systems", Baumueller Holding, Oct. 18, 2017 with English translation (4 pages).

* cited by examiner

VEHICLE-MOUNTED CONCRETE PUMP

APPLICATION FIELD AND PRIOR ART

The invention relates to a vehicle-mounted concrete pump.

OBJECT AND ACHIEVEMENT

The object on which the invention is based is that of providing a vehicle-mounted concrete pump which has improved properties.

The invention achieves this object by providing a vehicle-mounted concrete pump having the features of the independent claim. Advantageous developments and/or embodiments of the invention are described in the dependent claims.

The vehicle-mounted concrete pump according to the invention comprises a concrete pump system, a hydraulic drive pump system, a combustion drive motor system and a liquid-cooled, in particular water- or oil-cooled, synchronous drive motor. The concrete pump system is designed for, in particular automatically, conveying or for, in particular automatically, pumping concrete. The hydraulic drive pump system is designed for, in particular automatically and/or hydraulically, driving the concrete pump system. Furthermore, the hydraulic drive pump system has a hydraulic pump drive shaft. The combustion drive motor system is designed for, in particular automatically and/or mechanically, driving the hydraulic pump drive shaft of the hydraulic drive pump system. The liquid-cooled synchronous drive motor is designed for, in particular automatically and/or mechanically, driving the, in particular the same, hydraulic pump drive shaft of the hydraulic drive pump system.

The liquid-cooled synchronous drive motor can have a relatively small volume and/or a relatively low mass or a relatively low weight. Consequently, the liquid-cooled synchronous drive motor can allow that the liquid-cooled synchronous drive motor and the combustion drive motor system can drive the, in particular the same, hydraulic pump drive shaft of the hydraulic drive pump system. In particular, the vehicle-mounted concrete pump can have only a single hydraulic drive pump system, in particular having only a single hydraulic pump drive shaft. In other words: the vehicle-mounted concrete pump can or need not have a plurality of hydraulic drive pump systems having a plurality of hydraulic pump drive shafts. Consequently, the liquid-cooled synchronous drive motor can allow a relatively compact and/or relatively lightweight design of the vehicle-mounted concrete pump, in particular with relatively few components. Consequently, the vehicle-mounted concrete pump can for the first time allow effective working, in particular effective conveying of concrete, with relatively little or even with zero exhaust gas emission and/or with relatively low noise level or loudness level. In particular, the vehicle-mounted concrete pump can then be used on an inner-city construction site.

In particular, the vehicle-mounted concrete pump can be referred to as a mobile, in particular self-propelled, concrete pump.

In addition or alternatively, the concrete pump system can have at least one piston pump, in particular a double-piston pump, for, in particular automatically, conveying concrete.

Further in addition or alternatively, the hydraulic drive pump system can have a number of hydraulic drive pumps for, in particular automatically and/or hydraulically, driving the concrete pump system. The hydraulic pump drive shaft can be designed for, in particular automatically and/or mechanically, driving the number of hydraulic drive pumps. In particular, the number of hydraulic drive pumps can be mechanically rigidly connected to the hydraulic pump drive shaft, in particular be seated on the hydraulic pump drive shaft. In addition or alternatively, the hydraulic drive pump system can be different from the concrete pump system.

Further in addition or alternatively, the combustion drive motor system can have a, in particular only a single, combustion drive motor, in particular a diesel motor, for, in particular automatically and/or mechanically, driving the hydraulic pump drive shaft of the hydraulic drive pump system. In addition, the combustion drive motor system can have a vehicle transmission. Further in addition or alternatively, the combustion drive motor system can be different from the hydraulic drive pump system.

Further in addition or alternatively, the liquid-cooled synchronous drive motor can have a, in particular only a single, synchronous motor for, in particular automatically and/or mechanically, driving the hydraulic pump drive shaft of the hydraulic drive pump system. In particular, the synchronous motor can be one having a reluctance effect. In addition or alternatively, the synchronous motor can be a single-phase or three-phase synchronous machine in motor mode, in which a constantly magnetized rotor can be carried along synchronously by a moving magnetic rotary field in the stator. In addition, the liquid-cooled synchronous drive motor can have liquid cooling, in particular water or oil cooling, to cool, or for the cooling of, the synchronous motor. The liquid cooling can refer to a cooling system, in particular a cooling circuit system, in which the primarily heat-dissipating coolant can be a liquid, in particular water or oil. Further in addition or alternatively, the liquid-cooled synchronous drive motor can be different from the combustion drive motor system and/or from the hydraulic drive pump system.

Further in addition or alternatively, the vehicle-mounted concrete pump can be designed such that, in particular at one moment in time, either, in particular exclusively, the combustion drive motor system or, in particular exclusively, the liquid-cooled synchronous drive motor or, in particular simultaneously, the combustion drive motor system and the liquid-cooled synchronous drive motor can drive the hydraulic pump drive shaft of the hydraulic drive pump system. In addition, the vehicle-mounted concrete pump can be designed for, in particular automatically, switching or shifting between the combustion drive and/or the synchronous drive or electric mode and/or the hybrid mode. Further in addition or alternatively, the vehicle-mounted concrete pump can be referred to as a parallel hybrid vehicle-mounted concrete pump.

In one development of the invention, the vehicle-mounted concrete pump has a superstructure and a vehicle frame, which is in particular different from the superstructure. The superstructure carries the concrete pump system. The vehicle frame carries the superstructure. The liquid-cooled synchronous drive motor is spatially arranged in part between main longitudinal members of the superstructure and/or of the vehicle frame. This allows optimal utilization of the installation space. Expressed in other terms: the liquid-cooled synchronous drive motor can or need not be spatially arranged on the superstructure, or the superstructure can or need not carry the liquid-cooled synchronous drive motor. Consequently, the liquid-cooled synchronous drive motor can or need not take up any installation space or any area on the superstructure. In particular, the superstructure can be referred to as a platform, in particular in the right or left region of the vehicle-mounted concrete pump. In addition or alternatively, the vehicle frame can be referred to as a vehicle chassis. Further in addition or alternatively, the vehicle frame can be a truck frame, or the vehicle-mounted concrete pump can be built onto a truck. Further in addition or alternatively, the liquid-cooled synchronous drive motor can be spatially arranged completely between main longitudinal members of the superstructure and/or of the vehicle frame or can extend downwardly and/or upwardly beyond the main longitudinal members in the vertical direction.

In one development of the invention, the vehicle-mounted concrete pump has at least one driving axle. The combustion drive motor system is designed for, in particular automatically and/or mechanically, driving the at least one driving axle. Consequently, the combustion drive motor system can ensure not only driving operation but also pumping operation of the vehicle-mounted concrete pump. In particular, the vehicle-mounted concrete pump can be designed such that, in particular at one moment in time, the combustion drive motor system can drive either, in particular exclusively, the at least one driving axle or, in particular exclusively, the hydraulic pump drive shaft of the hydraulic drive pump system. In addition, the vehicle-mounted concrete pump can be designed for, in particular automatically, switching or shifting between driving operation and pumping operation.

In one embodiment of the invention, the vehicle-mounted concrete pump has a transfer case. The transfer case is designed such that, in particular at one moment in time, it can connect, in particular automatically and/or mechanically, the combustion drive motor system either to, in particular exclusively, the at least one driving axle or to, in particular exclusively, the hydraulic pump drive shaft of the hydraulic drive pump system.

In one embodiment of the invention, the combustion drive motor system is mechanically connected to the transfer case, in particular by means of a cardan shaft, in particular exclusively by means of the cardan shaft. This allows a relatively simple connection, in particular with relatively few components. In particular, the combustion drive motor system can or need not be hydraulically connected to the transfer case.

In one embodiment of the invention, the hydraulic drive pump system has a, in particular the, number of hydraulic drive pumps. The transfer case has an input side and an opposite or opposed output side. The combustion drive motor system and the liquid-cooled synchronous drive motor are spatially arranged, in particular completely, on the input side. Furthermore, the number of hydraulic drive pumps is spatially arranged, in particular completely, on the output side. This allows optimal utilization of the installation space. In particular, a hydraulic drive pump can or need not be spatially arranged on the input side. In addition or alternatively, the driving axle can be spatially arranged on the output side.

In one embodiment of the invention, the liquid-cooled synchronous drive motor is connected to the hydraulic pump drive shaft of the hydraulic drive pump system by or via the transfer case, in particular therethrough and/or mechanically, in particular is directly flanged onto the transfer case. This allows the transfer case to be used to distribute the mechanical energy of two drives, namely the combustion drive motor system and the liquid-cooled synchronous drive motor. In particular, the vehicle-mounted concrete pump can be designed for, in particular automatically, switching or shifting between the combustion drive and/or the synchronous drive and/or the hybrid mode by or via the transfer case. In addition or alternatively, the hydraulic pump drive shaft of the hydraulic drive pump system can extend through the transfer case, in particular from the output side to the input side. Further in addition or alternatively, the liquid-cooled synchronous drive motor can be flanged onto the transfer case on the same side as the combustion drive motor system and/or on the input side.

In one development of the invention, the liquid-cooled synchronous drive motor is mechanically rigidly connected to the hydraulic pump drive shaft of the hydraulic drive pump system, in particular the liquid-cooled synchronous drive motor is seated on the hydraulic pump drive shaft. This allows a relatively simple connection, in particular with relatively few components. In particular, the liquid-cooled synchronous drive motor can, without a disconnectable clutch or a freewheel, or need not by or via a disconnectable clutch or a freewheel, be connected to the hydraulic pump drive shaft of the hydraulic drive pump system and/or to the combustion drive motor system. In addition or alternatively, the liquid-cooled synchronous drive motor can be designed to idly run concomitantly or passively corotate, in particular in combustion drive mode.

In one development of the invention, the liquid-cooled synchronous drive motor is designed for an electrical rated power of at least 60 kilowatts (kW), in particular of at least 80 kW. In addition or alternatively, the liquid-cooled synchronous drive motor has an electrical rated power density of at least 0.4 kW per kilogram (kW/kg), in particular of at least 0.5 kW/kg. This can allow the liquid-cooled synchronous drive motor to be able to cover the full functionality of the vehicle-mounted concrete pump, in particular of the hydraulic drive pump system and thus of the concrete pump system, and to be able to be designed for full-load and part-load operation. In particular, the electrical rated power can refer to a continuous power, wherein the continuous power of the liquid-cooled synchronous drive motor can be the highest power which can be provided during an intended operation without time limitation and cannot compromise the service life and reliability of the liquid-cooled synchronous drive motor. In addition or alternatively, the electrical rated power can be defined by or via $P6=\sqrt{3} \times I \times U$ for three-phase current (I: current, U: voltage).

In one development of the invention, the vehicle-mounted concrete pump has an electricity mains connection. The electricity mains connection is electrically connected, in particular by or via an, in particular electrical, converter, to the liquid-cooled synchronous drive motor. Furthermore, the electricity mains connection is designed for electrical connection to an electrical construction site mains connection, in particular of a construction site power distribution box and/or of a three-phase mains system. This allows the relatively high power requirement of the vehicle-mounted concrete pump, in particular of the liquid-cooled synchronous drive motor, to be covered by or via the construction site current. If more power is required, the combustion drive motor system can be switched on. In particular, the electricity mains connection can be designed to output electrical power or electrical energy to the liquid-cooled synchronous drive motor. In addition or alternatively, the electricity mains connection can have a mains plug, in particular a three-phase current plug connector. Further in addition or alternatively, the vehicle-mounted concrete pump, in particular the electrical components, can be configured or designed in such a way that the pump driver himself can establish the electrical connection, in particular can plug the mains plug into a corresponding socket or box of the construction site mains connection. This can make it possible to avoid needing or having to call upon a separate electrician to electrically connect the vehicle-mounted concrete pump.

In one development of the invention, the vehicle-mounted concrete pump has an electrical energy store, in particular an accumulator. The electrical energy store is electrically connected, in particular by or via an, in particular the and/or electrical, converter, to the liquid-cooled synchronous drive motor. Furthermore, the electrical energy store is designed to output electrical power or electrical energy to the liquid-cooled synchronous drive motor. This makes it possible for the vehicle-mounted concrete pump to be at least partially electrically operated in the absence of an electrical construction site mains connection. If more power is required, the combustion drive motor system can be switched on. In particular, the vehicle-mounted concrete pump can be designed to charge the electrical energy store by or via the liquid-cooled synchronous drive motor as generator from the combustion drive motor system, in particular if the combustion drive motor system can provide more power or energy than is required, in particular temporarily, by the hydraulic drive pump system.

In one embodiment of the invention, the electrical energy store is electrically connected and designed to take up electrical power not required by the liquid-cooled synchronous drive motor, in particular temporarily or at a first moment in time, or excess electrical power from or with the electricity mains connection, in particular by or via an, in particular the and/or electrical, converter. Furthermore, the electrical energy store is designed to output electrical power or electrical energy required by the liquid-cooled synchronous drive motor, in particular temporarily or at a second moment in time different from the first, in addition to the electrical power from the electricity mains connection. Typically, the electrical construction site mains connection provides only a limited electrical power or is limited to a certain electrical power loading. The vehicle-mounted concrete pump, in particular the electrical energy store, makes it possible for the liquid-cooled synchronous drive motor, at least temporarily or intermittently, to have more electrical power made available to it than is provided by the electrical construction site mains connection. In particular, an, in particular brief, relatively high power requirement or a power peak of the liquid-cooled synchronous drive motor can be covered by the electricity mains connection or the electrical construction site mains connection and in addition the electrical energy store, in particular simultaneously. At moments in time with a relatively low power requirement, the electrical energy store can take up the nonrequired electrical power of the electricity mains connection. In other words: in the case of overload, the electrical energy store can be tapped, while in the case of a power reserve, the electrical energy store can be charged.

In one development of the invention, the vehicle-mounted concrete pump has a concrete distribution boom. The concrete distribution boom is designed for distributing concrete which is conveyed or pumped, in particular from the concrete pump system. The hydraulic drive pump system is designed to drive the concrete distribution boom.

Further advantages and aspects of the invention will emerge from the claims and from the following description of preferred exemplary embodiments of the invention, which are explained below with reference to the figures.

DETAILED DESCRIPTION OF THE EXEMPLARY EMBODIMENTS

FIGS. 1 to 4 show a vehicle-mounted concrete pump 1 according to the invention. The vehicle-mounted concrete pump 1 comprises a concrete pump system 2, a hydraulic drive pump system 3, a combustion drive motor system 5 and a liquid-cooled synchronous drive motor 6. The concrete pump system 2 is designed for conveying concrete. The hydraulic drive pump system 3 is designed for driving the concrete pump system 2. Furthermore, the hydraulic drive pump system 3 has a hydraulic pump drive shaft 4. The combustion drive motor system 5 is designed to drive the hydraulic pump drive shaft 4 of the hydraulic drive pump system 3. The liquid-cooled synchronous drive motor 6 is designed to drive the hydraulic pump drive shaft 4 of the hydraulic drive pump system 3.

Figure 2:
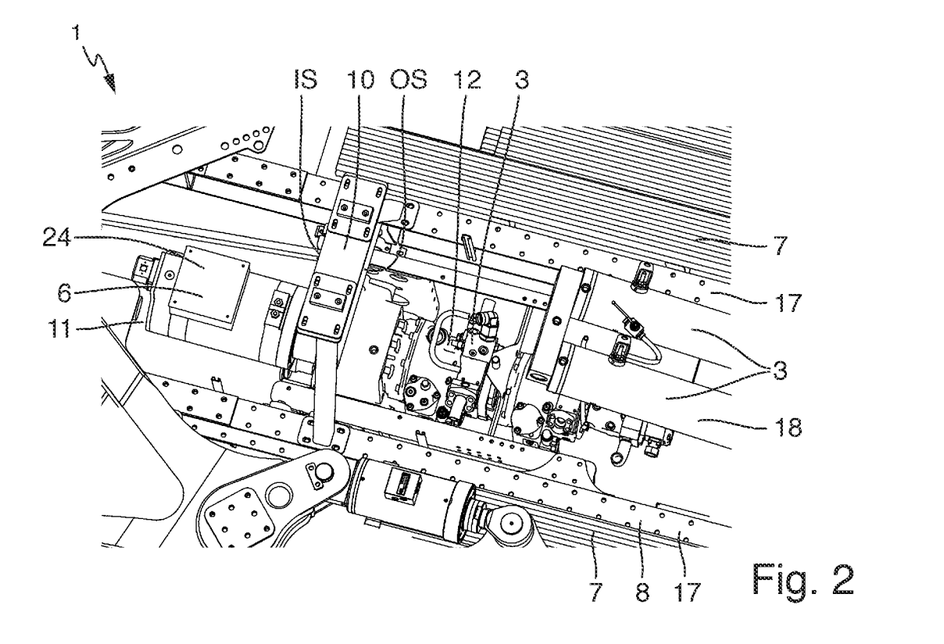
FIG. 2 shows a plan view of a superstructure and a vehicle frame in an installation region, which is marked by dashes in FIG. 1, of the vehicle-mounted concrete pump of FIG. 1.

In the exemplary embodiment shown, the concrete pump system 2 has at least one piston pump, in particular a double-piston pump, for conveying concrete. In addition, in the exemplary embodiment shown, the hydraulic drive pump system 3 has at least one drive cylinder 18, in particular two drive cylinders 18, and at least one drive piston, in particular two drive pistons, as shown in FIG. 2. The at least one drive piston is designed to drive the at least one piston pump. The hydraulic pump drive shaft 4 is designed to drive the at least one drive piston.

Figure 3:
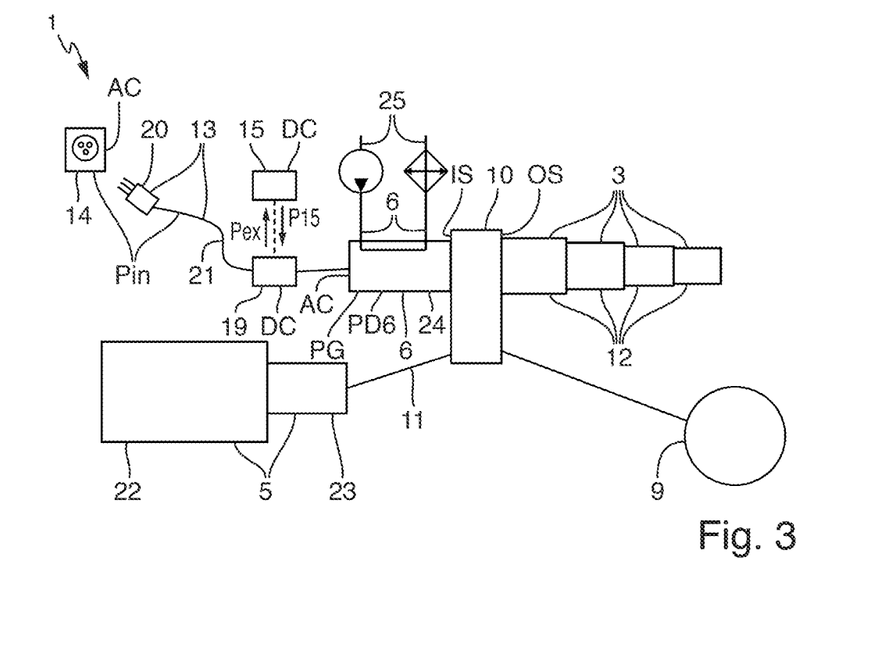
FIG. 3 shows a circuit diagram of the vehicle-mounted concrete pump of FIG. 1.

Furthermore, in the exemplary embodiment shown, the combustion drive motor system 5 has a combustion drive motor 22 for driving the hydraulic pump drive shaft 4 of the hydraulic drive pump system 3, as shown in FIG. 3. In addition, the combustion drive motor system 5 has a vehicle transmission 23.

Moreover, in the exemplary embodiment shown, the liquid-cooled synchronous drive motor 6 has a synchronous motor 24 for driving the hydraulic pump drive shaft 4 of the hydraulic drive pump system 3, as shown in FIG. 2. In addition, the liquid-cooled synchronous drive motor 6 has a liquid cooling system 25 for cooling the synchronous motor 24, as shown in FIG. 3.

Figure 1:
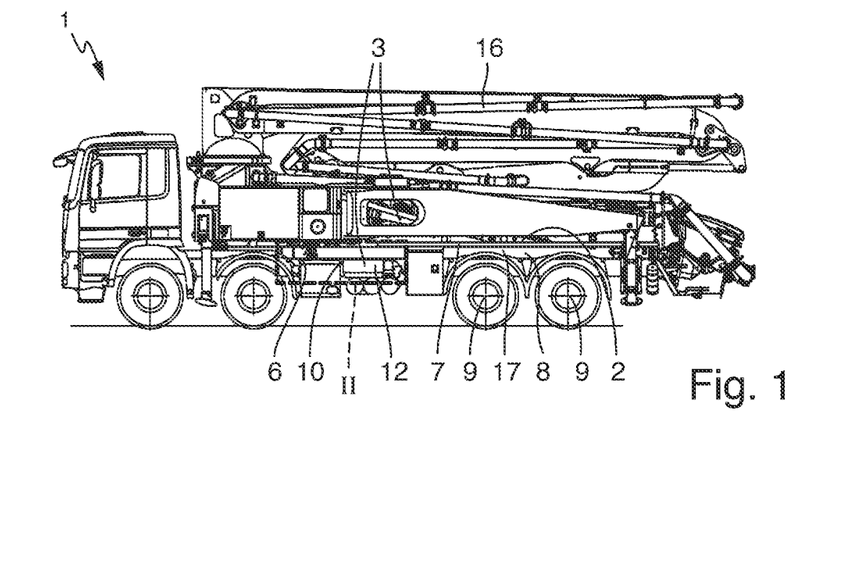
FIG. 1 shows a side view of a vehicle-mounted concrete pump according to the invention.

Furthermore, the vehicle-mounted concrete pump 2 has a concrete distribution boom 16, as shown in FIG. 1. The concrete distribution boom 16 is designed for distributing conveyed concrete. The hydraulic drive pump system 3 is designed for driving the concrete distribution boom 16.

In addition, the vehicle-mounted concrete pump has a superstructure 7 and a vehicle frame 8, as shown in FIG. 2. The superstructure 7 carries the concrete pump system 2. The vehicle frame 8 carries the superstructure 7. In the exemplary embodiment shown, the liquid-cooled synchronous drive motor 6, in particular the synchronous motor 24, is spatially arranged between main longitudinal members 17 of the vehicle frame 8. In alternative exemplary embodiments, the liquid-cooled synchronous drive motor can additionally or alternatively be spatially arranged between main longitudinal members of the superstructure.

In the exemplary embodiment shown, the superstructure 7 additionally carries the concrete distribution boom 16. Furthermore, in the exemplary embodiment shown, the hydraulic pump drive shaft 4 of the hydraulic drive pump system 3 is spatially arranged between the main longitudinal members 17 of the vehicle frame 8.

Moreover, the vehicle-mounted concrete pump 1 has at least one driving axle 9. The combustion drive motor system 5, in particular the combustion drive motor 22, is designed to drive the at least one driving axle 9, as shown in FIG. 3.

In the exemplary embodiment shown, the vehicle-mounted concrete pump 1 has two driving axles 9. In alternative exemplary embodiments, the vehicle-mounted concrete pump can have only a single driving axle or at least three driving axles. Furthermore, in the exemplary embodiment shown, the at least one driving axle 9 is a rear axle.

Figure 4:
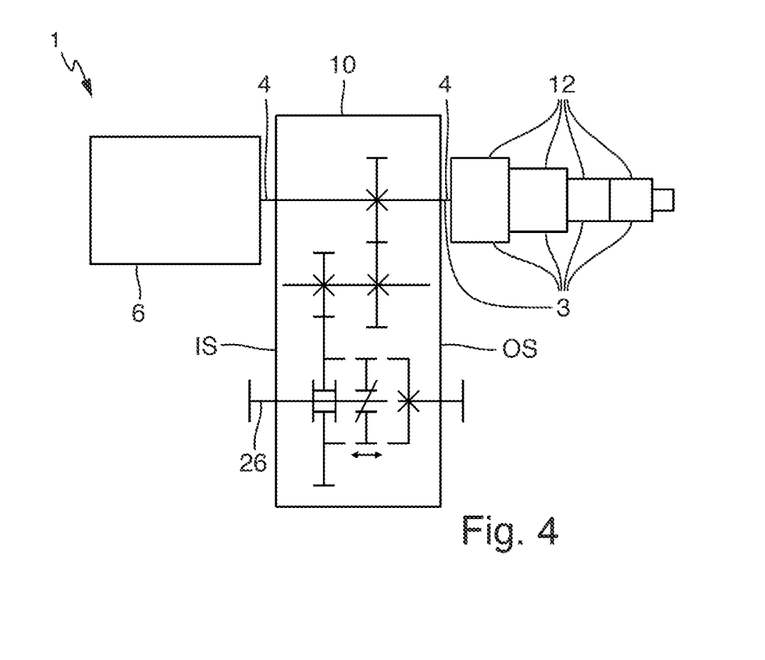
FIG. 4 shows a further circuit diagram of the vehicle-mounted concrete pump of FIG. 1.

In addition, the vehicle-mounted concrete pump 1 has a transfer case 10. The transfer case 10 is designed to connect the combustion drive motor system 5 either to the at least one driving axle 9 or to the hydraulic pump drive shaft 4 of the hydraulic drive pump system 3, as shown in FIG. 4.

In the exemplary embodiment shown, the transfer case 10 is spatially arranged between the main longitudinal members 17 of the vehicle frame 8.

In detail, the combustion drive motor system 5, in particular the vehicle transmission 23, is mechanically connected to the transfer case 10, in particular by means of a cardan shaft 11.

Furthermore, the hydraulic drive pump system 3 has a number of hydraulic drive pumps 12. The transfer case 10 has an input side IS and an opposite output side OS. The combustion drive motor system 5, in particular the combustion drive motor 22 and the vehicle transmission 23, and the liquid-cooled synchronous drive motor 6, in particular the synchronous motor 24, are spatially arranged on the input side IS. Moreover, the number of hydraulic drive pumps 12 is spatially arranged on the output side OS, in particular directly flanged onto the transfer case 10.

In the exemplary embodiment shown, the hydraulic drive pump system 3 has four hydraulic drive pumps 12. In alternative exemplary embodiments, the hydraulic drive pump system can have only a single hydraulic drive pump or two, three or at least five hydraulic drive pumps. Furthermore, in the exemplary embodiment shown, the at least one driving axle 9 is spatially arranged on the output side OS. In addition, in the exemplary embodiment shown, the number of hydraulic drive pumps 12 is spatially arranged between the main longitudinal members 17 of the vehicle frame 8. Furthermore, in alternative exemplary embodiments, at least one of the number of hydraulic drive pumps can be spatially arranged on the input side. In particular, the liquid-cooled synchronous drive motor, in particular the synchronous motor, can be arranged, in particular with a through drive, between the hydraulic drive pump arranged on the input side and the transfer case.

In detail, the number of hydraulic drive pumps 12 is designed to drive the concrete pump system 2, in particular the at least one drive piston. The hydraulic pump drive shaft 4 is designed to drive the number of hydraulic drive pumps 12. In the exemplary embodiment shown, the number of hydraulic drive pumps 12 is mechanically rigidly connected to the hydraulic pump drive shaft 4, with in particular the number of hydraulic drive pumps 12 being seated on the hydraulic pump drive shaft 4.

Moreover, the liquid-cooled synchronous drive motor 6, in particular the synchronous motor 24, is connected to the hydraulic pump drive shaft 4 of the hydraulic drive pump system 3 by the transfer case 10, in particular being directly flanged onto the transfer case 10.

Furthermore, the liquid-cooled synchronous drive motor 6, in particular the synchronous motor 24, is mechanically rigidly connected to the hydraulic pump drive shaft 4 of the hydraulic drive pump system 3, with in particular the liquid-cooled synchronous drive motor 6, in particular the synchronous motor 24, being seated on the hydraulic pump drive shaft 4.

In detail, the hydraulic pump drive shaft 4 of the hydraulic drive pump system 3 extends through the transfer case 10, in particular from the output side OS to the input side IS.

In addition, the liquid-cooled synchronous drive motor 6, in particular the synchronous motor 24, is designed for idle concomitant running.

In alternative exemplary embodiments, the liquid-cooled synchronous drive motor, in particular the synchronous motor, can be connected to the hydraulic pump drive shaft of the hydraulic drive pump system and/or to the combustion drive motor system via a disconnectable clutch or a freewheel, in particular between the liquid-cooled synchronous drive motor, in particular the synchronous motor, and the transfer case, in particular if the liquid-cooled synchronous drive motor, in particular the synchronous motor, cannot be designed for idle concomitant running.

In addition or alternatively, it is possible in alternative exemplary embodiments for the liquid-cooled synchronous drive motor, in particular the synchronous motor, to have, in particular be, a hollow-shaft motor. The hollow-shaft motor can be seated on the cardan shaft and be designed to drive the cardan shaft. Further in addition or alternatively, it is possible in alternative exemplary embodiments for the liquid-cooled synchronous drive motor, in particular the synchronous motor, in particular the hollow-shaft motor, to be integrated into the vehicle transmission, where present.

If, in the exemplary embodiment shown, a displacement shaft 26 of the transfer case 10 is displaced to the left in FIG. 4, the combustion drive motor system 5 can drive the hydraulic pump drive shaft 4 of the hydraulic drive pump system 3. A shaft of the liquid-cooled synchronous drive motor 6, in particular of the synchronous motor 24, can idly run concomitantly. Alternatively, the liquid-cooled synchronous drive motor 6, in particular the synchronous motor 24, can additionally drive the hydraulic pump drive shaft 4 of the hydraulic drive pump system 3. The at least one driving axle 9 is decoupled.

If, in the exemplary embodiment shown, the displacement shaft 26 of the transfer case 10 is displaced to the right in FIG. 4, the combustion drive motor system 5 can drive the at least one driving axle 9. The liquid-cooled synchronous drive motor 6, in particular the synchronous motor 24, can drive the hydraulic pump drive shaft 4 of the hydraulic drive pump system 3. The displacement shaft 26 and an upper shaft in FIG. 4, in particular the hydraulic pump drive shaft 4, are decoupled.

Furthermore, the liquid-cooled synchronous drive motor 6, in particular the synchronous motor 24, is designed for an electrical rated power P6 of at least 60 kW, in particular of at least 80 kW. In addition, the liquid-cooled synchronous drive motor 6, in particular the synchronous motor 24, has an electrical rated power density PD6 of at least 0.4 kW/kg, in particular of at least 0.5 kW/kg.

Moreover, the vehicle-mounted concrete pump 1 has an electricity mains connection 13. The electricity mains connection 13 is electrically connected, in particular by a converter 19, to the liquid-cooled synchronous drive motor 6, in particular to the synchronous motor 24. Furthermore, the electricity mains connection 13 is designed for electrical connection to an electrical construction site mains connection 14, in particular a three-phase current mains system.

In detail, the electricity mains connection 13 has a mains plug 20 and a power cable 21.

If, in the exemplary embodiment shown, the electricity mains connection 13 or the electrical construction site mains connections 14 feeds the liquid-cooled synchronous drive motor 6, in particular the synchronous motor 24, the converter 19 converts alternating voltage AC to direct voltage DC to alternating voltage AC.

In addition, the vehicle-mounted concrete pump 1 has an electrical energy store 15. The electrical energy store 15 is electrically connected, in particular by the converter 19, to the liquid-cooled synchronous drive motor 6, in particular to the synchronous motor 24. Furthermore, the electrical energy store 15 is designed to output electrical power P15 to the liquid-cooled synchronous drive motor 6, in particular the synchronous motor 24.

If, in the exemplary embodiment shown, the electrical energy store 15 feeds the liquid-cooled synchronous drive motor 6, in particular the synchronous motor 24, the converter 19 converts direct voltage DC to alternating voltage AC.

In detail, the electrical energy store 15 is electrically connected and designed to take up electrical power Pex not required by the liquid-cooled synchronous drive motor 6, in particular the synchronous motor 24, from the electricity mains connection 13, in particular by means of the converter 19. Moreover, the electrical energy store 15 is designed to output electrical power P15 required by the liquid-cooled synchronous drive motor 6, in particular the synchronous motor 24, in addition to the electrical power Pin from the electricity mains connection 13.

If, in the exemplary embodiment shown, the electricity mains connection 13 or the electrical construction site mains connection 14 feeds or charges the electrical energy store 15, the converter 19 converts alternating voltage AC to direct voltage DC.

In the exemplary embodiment shown, the vehicle-mounted concrete pump 1 has the electricity mains connection 13 and the electrical energy store 15. In alternative exemplary embodiments, the vehicle-mounted concrete pump can have only the electricity mains connection. Expressed in other terms: in alternative exemplary embodiments, the vehicle-mounted concrete pump can or need not have the electrical energy store. In particular, the vehicle-mounted concrete pump can be referred to as a store-free parallel hybrid vehicle-mounted concrete pump.

As is made clear by the exemplary embodiments shown and explained above, the invention provides an advantageous vehicle-mounted concrete pump which has improved properties. In particular, the vehicle-mounted concrete pump allows for the first time effective working with relatively low or even with zero exhaust gas emission and with a relatively low noise level.

The invention claimed is:

1. A vehicle-mounted concrete pump, wherein the vehicle-mounted concrete pump comprises:
    a concrete pump system, wherein the concrete pump system is designed to convey concrete,
    a hydraulic drive pump system, wherein the hydraulic drive pump system is designed to drive the concrete pump system and has a hydraulic pump drive shaft,
    a combustion drive motor system, wherein the combustion drive motor system is designed to drive the hydraulic pump drive shaft of the hydraulic drive pump system,
    a liquid-cooled synchronous drive motor, wherein the liquid-cooled synchronous drive motor is designed to drive the hydraulic pump drive shaft of the hydraulic drive pump system,
    at least one driving axle, wherein the combustion drive motor system is designed to drive the at least one driving axle,
    a transfer case, wherein the transfer case is designed to connect the combustion drive motor system either to the at least one driving axle or to the hydraulic pump drive shaft of the hydraulic drive pump system,
    wherein the combustion drive motor system is mechanically connected, via a cardan shaft, to the transfer case.

2. The vehicle-mounted concrete pump as claimed in claim 1, wherein the vehicle-mounted concrete pump comprises:
    a superstructure, wherein the superstructure carries the concrete pump system, and
    a vehicle frame, wherein the vehicle frame carries the superstructure,
    wherein the liquid-cooled synchronous drive motor is spatially arranged in part between main longitudinal members of the superstructure and/or of the vehicle frame.

3. The vehicle-mounted concrete pump as claimed in claim 1,
    wherein the liquid-cooled synchronous drive motor is mechanically rigidly connected to the hydraulic pump drive shaft of the hydraulic drive pump system.

4. The vehicle-mounted concrete pump as claimed in claim 3,
    wherein the liquid-cooled synchronous drive motor is seated on the hydraulic pump drive shaft.

5. The vehicle-mounted concrete pump as claimed in claim 1,
    wherein the liquid-cooled synchronous drive motor is designed for an electrical rated power of at least 60 kW, and/or
    wherein the liquid-cooled synchronous drive motor has an electrical rated power density of at least 0.4 kW/kg.

6. The vehicle-mounted concrete pump as claimed in claim 1, wherein the vehicle-mounted concrete pump comprises:
    an electricity mains connection, wherein the electricity mains connection is electrically connected, via a converter, to the liquid-cooled synchronous drive motor and is designed for electrical connection to an electrical construction site mains connection.

7. The vehicle-mounted concrete pump as claimed in claim 6, wherein the vehicle-mounted concrete pump comprises:
    an electrical energy store, wherein the electrical energy store is electrically connected, via a converter, to the liquid-cooled synchronous drive motor and is designed to output electrical power to the liquid-cooled synchronous drive motor.

8. The vehicle-mounted concrete pump as claimed in claim 7,
    wherein the electrical energy store is electrically connected and designed to take up electrical power not required by the liquid-cooled synchronous drive motor from the electricity mains connection, and
    wherein the electrical energy store is designed to output electrical power required by the liquid-cooled synchronous drive motor, in addition to the electrical power from the electricity mains connection.

9. The vehicle-mounted concrete pump as claimed in claim 1, wherein the vehicle-mounted concrete pump comprises:
a concrete distribution boom, wherein the concrete distribution boom is designed to distribute conveyed concrete,
wherein the hydraulic drive pump system is designed to drive the concrete distribution boom.

10. The vehicle-mounted concrete pump as claimed in claim 1,
wherein the liquid-cooled synchronous drive motor is designed for an electrical rated power of at least 80 kW, and/or
wherein the liquid-cooled synchronous drive motor has an electrical rated power density of at least 0.5 kW/kg.

11. The vehicle-mounted concrete pump as claimed in claim 1, wherein the vehicle-mounted concrete pump comprises:
an electrical energy store wherein the electrical energy store is electrically connected, via a converter, to the liquid-cooled synchronous drive motor and is designed to output electrical power to the liquid-cooled synchronous drive motor.

12. A vehicle-mounted concrete pump, wherein the vehicle-mounted concrete pump comprises:
a concrete pump system, wherein the concrete pump system is designed to convey concrete,
a hydraulic drive pump system, wherein the hydraulic drive pump system is designed to drive the concrete pump system and has a hydraulic pump drive shaft,
a combustion drive motor system, wherein the combustion drive motor system is designed to drive the hydraulic pump drive shaft of the hydraulic drive pump system,
a liquid-cooled synchronous drive motor, wherein the liquid-cooled synchronous drive motor is designed to drive the hydraulic pump drive shaft of the hydraulic drive pump system,
at least one driving axle, wherein the combustion drive motor system is designed to drive the at least one driving axle,
a transfer case, wherein the transfer case is designed to connect the combustion drive motor system either to the at least one driving axle or to the hydraulic pump drive shaft of the hydraulic drive pump system,
wherein the hydraulic drive pump system has a number of hydraulic drive pumps, and
wherein the transfer case has an input side and an opposite output side, wherein the combustion drive motor system and the liquid-cooled synchronous drive motor are spatially arranged on the input side, and the number of hydraulic drive pumps is spatially arranged on the output side.

13. A vehicle-mounted concrete pump, wherein the vehicle-mounted concrete pump comprises:
a concrete pump system, wherein the concrete pump system is designed to convey concrete,
a hydraulic drive pump system, wherein the hydraulic drive pump system is designed to drive the concrete pump system and has a hydraulic pump drive shaft,
a combustion drive motor system, wherein the combustion drive motor system is designed to drive the hydraulic pump drive shaft of the hydraulic drive pump system,
a liquid-cooled synchronous drive motor, wherein the liquid-cooled synchronous drive motor is designed to drive the hydraulic pump drive shaft of the hydraulic drive pump system,
at least one driving axle, wherein the combustion drive motor system is designed to drive the at least one driving axle,
a transfer case, wherein the transfer case is designed to connect the combustion drive motor system either to the at least one driving axle or to the hydraulic pump drive shaft of the hydraulic drive pump system, and
wherein the liquid-cooled synchronous drive motor is connected to the hydraulic pump drive shaft of the hydraulic drive pump system by the transfer case.

14. A vehicle-mounted concrete pump, wherein the vehicle-mounted concrete pump comprises:
a concrete pump system, wherein the concrete pump system is designed to convey concrete,
a hydraulic drive pump system, wherein the hydraulic drive pump system is designed to drive the concrete pump system and has a hydraulic pump drive shaft,
a combustion drive motor system, wherein the combustion drive motor system is designed to drive the hydraulic pump drive shaft of the hydraulic drive pump system,
a liquid-cooled synchronous drive motor, wherein the liquid-cooled synchronous drive motor is designed to drive the hydraulic pump drive shaft of the hydraulic drive pump system, and
an electricity mains connection, wherein the electricity mains connection is electrically connected, via a converter, to the liquid-cooled synchronous drive motor and is designed for electrical connection to an electrical construction site mains connection.

15. The vehicle-mounted concrete pump as claimed in claim 14, wherein the vehicle-mounted concrete pump comprises:
at least one driving axle, wherein the combustion drive motor system is designed to drive the at least one driving axle.

16. The vehicle-mounted concrete pump as claimed in claim 14, wherein the vehicle-mounted concrete pump comprises:
a transfer case, wherein the transfer case is designed to connect the combustion drive motor system either to the at least one driving axle or to the hydraulic pump drive shaft of the hydraulic drive pump system.

17. The vehicle-mounted concrete pump as claimed in claim 16,
wherein the combustion drive motor system is mechanically connected, via a cardan shaft, to the transfer case.

18. The vehicle-mounted concrete pump as claimed in claim 16,
wherein the hydraulic drive pump system has a number of hydraulic drive pumps, and
wherein the transfer case has an input side and an opposite output side, wherein the combustion drive motor system and the liquid-cooled synchronous drive motor are spatially arranged on the input side, and the number of hydraulic drive pumps is spatially arranged on the output side.

19. The vehicle-mounted concrete pump as claimed in claim 16,
wherein the liquid-cooled synchronous drive motor is connected to the hydraulic pump drive shaft of the hydraulic drive pump system by the transfer case.

20. The vehicle-mounted concrete pump as claimed in claim 19,
wherein the liquid-cooled synchronous drive motor is directly flanged onto the transfer case.

21. A vehicle-mounted concrete pump, wherein the vehicle-mounted concrete pump comprises:
a concrete pump system, wherein the concrete pump system is designed to convey concrete,
a hydraulic drive pump system, wherein the hydraulic drive pump system is designed to drive the concrete pump system and has a hydraulic pump drive shaft,
a combustion drive motor system, wherein the combustion drive motor system is designed to drive the hydraulic pump drive shaft of the hydraulic drive pump system,
a liquid-cooled synchronous drive motor, wherein the liquid-cooled synchronous drive motor is designed to drive the hydraulic pump drive shaft of the hydraulic drive pump system, and
an electrical energy store, wherein the electrical energy store is electrically connected, via a converter, to the liquid-cooled synchronous drive motor and is designed to output electrical power to the liquid-cooled synchronous drive motor.

\* \* \* \* \*